Feb. 23, 1960   A. A. PORTER   2,926,266
CIRCUIT AND APPARATUS FOR FACILITATING
THE BOOSTING OF A RUN-DOWN BATTERY
Filed Dec. 30, 1957
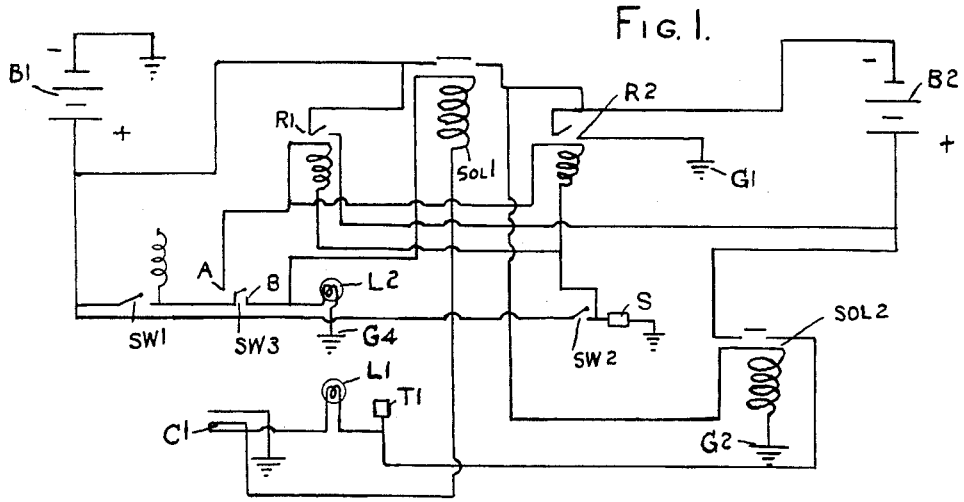
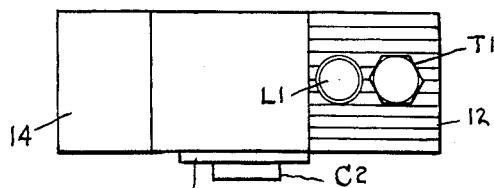
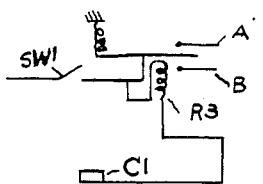
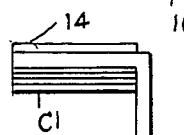
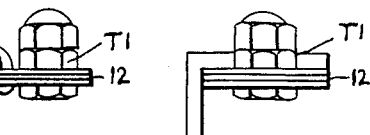
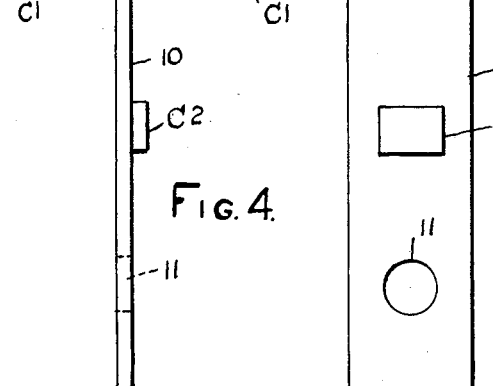
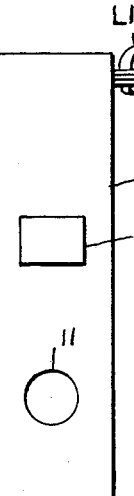
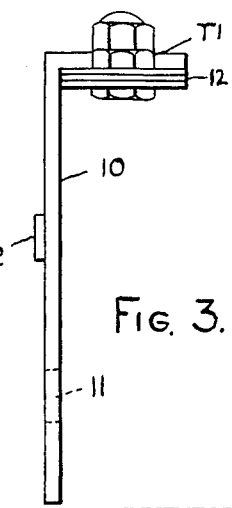
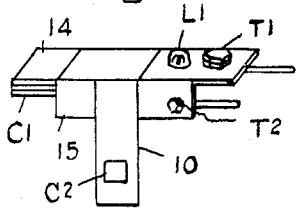
INVENTOR
ARTHUR A. PORTER
BY Holcombe, Wetherill + Brisebois
ATTORNEY

United States Patent Office 2,926,266
Patented Feb. 23, 1960

2,926,266
CIRCUIT AND APPARATUS FOR FACILITATING THE BOOSTING OF A RUN-DOWN BATTERY

Arthur A. Porter, Findlay, Ohio

Application December 30, 1957, Serial No. 705,881

7 Claims. (Cl. 307—10)

My invention relates to a circuit and apparatus for facilitating the boosting of a run-down battery which is unable to start the automobile in which it is installed, so that the car may be started and driven to the service station where the battery may be tested to determine whether it may be recharged or requires replacement.

This is ordinarily accomplished by connecting one or more batteries in a service vehicle across the terminals of the battery to be boosted. To facilitate this operation it is desirable to have terminals connected to the battery or batteries in the service vehicle conveniently located on the exterior thereof so that it is not necessary to get under the hood of the service vehicle to make the necessary connections. However, these terminals should not be "live" unless immediate boosting is contemplated, since the presence of "live" exterior terminals might be dangerous in the event of a traffic accident involving the truck.

Since, moreover, it is necessary to provide the service vehicle with twelve or more volts for boosting stalled vehicles, it is customary to provide the service vehicle with two or more batteries.

It is necessary for the operator to have certain options as to the connections between these batteries and each other and between the batteries and the exterior booster terminals and/or certain other electrical equipment normally carried by the service vehicle.

For instance, the two batteries should be isolated from each other when not in use, so as to avoid the possibility that one will drain the other if their voltage characteristics differ.

On the other hand, a parallel connection between the two batteries is necessary when the service vehicle is being driven about in order to maintain the batteries in a charged condition at all times.

Series operation, is however, preferable when boosting is being carried out, since the vehicle in need of assistance may have a 12 rather than a 6 volt system, and there is in any event a voltage drop in the booster connectors when a six volt system is being boosted such that the two 6 volt boosting batteries in series supply only about 8 volts across the 6 volt battery being boosted. Means should also be provided for making certain that the polarity of the connection made to the stalled vehicle is correct.

For satisfactory operation the coils of the solenoid switches used to series connect the service vehicle's batteries with the stanchion terminals should only be energized during the actual boosting operation.

Furthermore, the 30 ampere relays most suitable for use in completing the parallel circuit should not be exposed to the heavy current required to crank the engine, so that means should be provided for opening contacts of these relays during cranking. Finally, the arrangement should be such as to permit the connection of a remote control cable enabling the operator to be seated in the stalled vehicle during boosting.

My invention relates to a circuit and apparatus having all of these desirable characteristics and two embodiments thereof are illustrated in the accompanying drawings. In one of these the change from a parallel to a series connection is made manually and in the other it is completed automatically.

In the drawings:

Figure 1 is a circuit diagram showing a manually controlled circuit embodying my invention;

Figure 2 is a front view of a terminal-carrying stanchion adapted to be connected to the front bumper or any other convenient and properly grounded location on the exterior of a vehicle equipped with my new boosting system;

Figures 3, 4 and 5 are respectively right side, left side and plan views of the terminal stanchion of Figure 2;

Figure 6 is a circuit diagram showing a relay arrangement which may be substituted for the manually operated switch SW3 of Figure 1;

Figure 7 is a perspective view showing on a smaller scale a modified terminal stanchion provided with both 6 and 12 volt terminals.

Like reference characters denote like parts throughout the several views.

As seen in Figure 1, the positive terminal of the main battery B1 of the boosting vehicle is connected to the ignition switch SW1 and directly to the starter switch SW2 and thence through the starter S to ground.

The movable arm of a single-pole double-throw control switch SW3 is permanently connected to the ignition coil side of the ignition switch SW1 and its contact A is connected through the coils of relays R1 and R2 (which are connected in parallel) to the starter side of starter switch SW2.

From contact B of control switch SW3 a series connection actuating circuit leads through the coil of solenoid SOL1 to a sheet brass contact C1 carried by the steel terminal stanchion 10, which is adapted to be bolted to the bumper of the "boosting" vehicle by means of bolts passed through the bolt hole 11. The contact C1 is insulated from the stanchion 10 by means of fibre insulation 12 and connected through the filament of a pilot light L1 to a terminal T1 also insulated from the stanchion.

A paralleling circuit leads from the positive terminal of battery B1 through relay R1 to the positive terminal of auxiliary battery B2, the negative terminal of which may be connected to ground at G1 through relay R2.

An intermediate series circuit from the positive terminal of battery B1 to the negative terminal of battery B2 is closed when solenoid S1 is actuated by the flow of current in the series actuating circuit. This simultaneously closes a series connection completing circuit from the positive terminal of B1 (negative of B2) through the solenoid of solenoid-operated switch SOL2 to ground at G2, thus closing a circuit from the positive terminal of battery B2 to the insulated terminal T1 on the terminal stanchion 10.

The stanchion is provided with a brazed ground contact C2.

Another pilot light L2 is connected between the B terminal of switch SW3 and ground at G4. All "grounds" referred to are simply points on the vehicle frame.

The operation of the system, once installed, is as follows:

When the service vehicle is not being used, the ignition switch SW1 is open and there is no connection between the two batteries.

When the service vehicle equipped with the system is to be driven, the control switch SW3 is closed across contact A and the ignition switch is turned on. The coils of the relays R1 and R2 are energized, connecting the positive terminals of the two batteries to each other through relay R1 and the negative terminal of battery B2 to ground through R2, thus paralleling the two batteries which then supply the lights and other electrical necessities of the vehicle. However, 30 ampere relays are not adapted to pass the current required for starting, so when the starter switch SW2 is closed, the voltage at the starter terminal now balances the voltage at the switch SW3 side of the relay coils. This drops the voltage across said coils to zero, deenergizing said coils, and this causes the relay contacts to open, breaking the circuit between the batteries B1 and B2. However, when the engine is started and the starter switch is opened the relay coils are again energized, re-establishing the charging circuit between the batteries.

When boosting is to take place, the movable arm of the control switch SW3 is swung away from the contact A, thus breaking the circuit to the starter switch, and into engagement with contact B. With the ignition switch closed, the circuit of B1 is completed through the coil of SOL1 to the circuit grounding terminal C1 on stanchion 10, although no current will flow until C1 is connected to ground by connecting a battery booster clip or remote control cable clip over contact C1 thus connecting C1 through the clip to the flange 14 of the grounded stanchion 10. When this ground connection is made, the solenoid of switch SOL1 is energized and this switch closes to connect the positive terminal of battery B1 to the negative terminal of battery B2, and through the solenoid of solenoid actuated switch SOL2 to ground, thus energizing the solenoid of actuated switch SOL2 which closes and connects the positive terminal of battery B2 to the insulated terminal T1 on the stanchion 10, to complete the boosting circuit.

As a safety precaution, the ground contact C2 should first be connected to one terminal of the battery to be boosted and insulated terminal T1 to the other. If the polarity of the connections is incorrect, a current will flow between C1 and T1 and the lamp L1 will light up. The connection of the booster cables at T1 and C2 should then be reversed. Boosting will then take place when the clip attaching the booster cable to C2 is transferred to C1, so as to complete a connection between C1 and the grounded flange 14 of the stanchion. A boost current of between 100 and 140 amperes now flows through the battery of the stalled vehicle, raising the voltage across the battery to approximately eight volts. Upon completion of the boosting operation the service operator removes the booster cables and places the control switch in the normal, or charging position, and in so doing reverses the foregoing sequence. Thus the stalled vehicle is not only started, but the battery also receives a boost charge which enables the owner to proceed to the service station for what ever additional service may be necessary. The foregoing applies to six volt systems only.

In the case of a twelve volt equipped stalled vehicle the pilot lamp will light up very brightly to indicate a wrong, or series connection, while lighting very dimly if at all when the correct connection has been made. Should the service operator fail to place the control switch in the boost position before attaching the booster cables to the battery to be boosted the pilot lamp will light up even when the booster clamps are interchanged. It also lights up during the boosting operation. Thus we have one pilot lamp giving four separate and distinct indications, which, when once understood, becomes a very valuable asset.

In case the driver of the stalled vehicle is not present the service operator can leave the booster battery clamp attached to the ground terminal C2, and attach a remote control cable clamp to the circuit grounding terminal C1, and by extending the remote control cable to the stalled vehicle he can have positive control of the booster circuit while starting the customer's stalled vehicle.

The remote control cable consists of a two-conductor wire or cable having a two-circuit clamp attached to one end, and a push button switch attached to the other. When the push button is depressed the circuit is closed and current will flow from one side of the clamp through the circuit thus formed, to the opposite side of the clamp. This gives the operator complete control of the boosting current at all times.

A relay R3 may be substituted for the control switch SW3 as shown in Figure 6, to make the completion of the shift to the series connection automatic when the booster cables are connected across the battery to be boosted. The coil of this relay is connected between the ignition coil side of the ignition switch and the contact C1 so as to be energized whenever the ignition switch SW1 is closed and the contact C1 is grounded.

The pilot light L2 is used only with the manual switch and is always lit when the switch SW3 is in boosting, or contact B position.

If it is desired to provide only a 6 volt boosting current, the stanchion shown in Figures 2–6 may be modified as shown in Figure 7 by adding a second strip of insulating material 15, on which is mounted a second terminal T2, insulated from the stanchion, and connected between said batteries to deliver six instead of twelve volts.

It will be appreciated that while in the specific embodiment disclosed 6 volt batteries are employed and the negative terminal of the main battery is grounded, batteries delivering other voltages may be employed, and the positive rather than the negative terminal of the main battery could be grounded, with a consequent reversal of polarity throughout the system.

What I claim is:

1. A two battery system for providing power for the electrical system of a first vehicle which carries main and auxiliary batteries and an ignition switch and starter switch, said system serving to boost the battery of a second vehicle, comprising a terminal stanchion adapted to be attached to the exterior of said first vehicle, said stanchion being provided with a grounding terminal and at least one additional terminal insulated from said grounding terminal, one of said additional terminals being connected through the solenoid of a first solenoid-operated switch to a first terminal of a double-throw control switch, the movable arm of which is permanently connected to the coil side of said ignition switch, said first solenoid-operated switch when closed completing a connection between the positive terminal of said main battery and the negative terminal of said auxiliary battery, the positive terminal of said auxiliary battery being connected to said insulated terminal on said stanchion across the contacts of a second solenoid-operated switch, the solenoid of which is connected between ground and the negative terminal of said auxiliary battery, relay controlled connections between the positive terminals of said batteries and between the negative terminal of said auxiliary battery and ground, and a relay control circuit extending from a second terminal of said control switch through the coils of said relays to the line connecting the starter switch and starter, all of said relays and solenoid operated switches being biased to open position when said coils and solenoids are not energized.

2. A system for optionally connecting main and auxiliary batteries in parallel to power the electrical system of a vehicle carrying said batteries or in series to boost the battery of another vehicle, said system comprising a terminal stanchion carrying a grounding terminal and two additional terminals electrically connected together through the filament of a pilot light and insulated from said grounding terminal, a line connecting the positive terminal of said main battery to the negative terminal of said auxiliary battery, a solenoid operated switch controlling said line, a double throw switch having a movable arm permanently connected to the coil side of said ignition switch, one contact of said control switch being connected through the solenoid of a said first solenoid actuated switch to one of said additional terminals on said stanchion, and the other contact of said control switch being connected through the coils of two paralleled relays to the line connecting said starter switch and starter, one of said relays connecting the positive terminals of said batteries, and the other relay connecting the negative terminal of said auxiliary battery to ground, and a second solenoid operated switch the contacts of which control a connection between the positive terminal of the auxiliary battery and one of said additional stanchion terminals, the solenoid of said last mentioned switch being connected between the negative terminal of said auxiliary battery and ground.

3. A system for alternatively connecting main and auxiliary batteries carried by a "boosting" vehicle in parallel to power the electrical system of said vehicle or in series to boost the battery of another vehicle, said system comprising a double throw control switch connected between said ignition and starter switches with its movable arm permanently connected to the coil side of the ignition switch and provided with first and second contacts, terminal stanchion adapted to be attached to the exterior of the vehicle, said stanchion carrying a grounding terminal and a second terminal insulated from said grounding terminal and boosting vehicle, paralleling means for electrically connecting the positive terminal of said main battery to the positive terminal of said auxiliary battery and the negative terminal of said auxiliary battery to ground, series connection initiating means permanently connected between the first contact of said control switch and said insulated stanchion terminal, intermediate series connection means actuated by the flow of current in said series connection initiating means, for connecting the positive terminal of said main battery to the negative terminal of said auxiliary battery, series connection completion means connected between the negative terminal of said auxiliary battery and ground and actuated by completion of said last mentioned connection to complete a connection between the positive terminal of said auxiliary battery and said insulated stanchion terminal, and a by-pass circuit leading from the second contact of said control switch to the starter side of said starter switch, said paralleling means being actuated by the flow of current in this by-pass circuit, so that when the arm of said control switch engages said second contact with said starter switch open, current flows through said by-pass circuit and actuates said paralleling means to connect said batteries in parallel, but when said starter switch is closed the current between said ignition switch and starter flows across said starter switch rather than said bypass, thus breaking said parallel connection.

4. A system as claimed in claim 3 in which said terminal stanchion is provided with an additional electrical contact means, insulated from said grounding terminal and vehicle but electrically connected to said insulated terminal through the filament of an electric warning light.

5. A system as claimed in claim 4 in which said paralleling means comprises relays with their coils connected in parallel in said by-pass circuit.

6. A system as claimed in claim 5 in which said terminal stanchion is provided with a second electrical terminal, insulated from said stanchion, and connected to said connection initiating means.

7. A system as claimed in claim 6 in which a pilot light is electrically connected between the second contact of said control switch and ground.

References Cited in the file of this patent

Publication: Magazine, "Popular Science Monthly," December 1946, page 138.